US008095278B2

(12) United States Patent
Schaaf et al.

(10) Patent No.: US 8,095,278 B2
(45) Date of Patent: Jan. 10, 2012

(54) INTERFACE FOR VEHICLE FUNCTION CONTROL VIA A TOUCH SCREEN

(75) Inventors: Dennis Timothy Schaaf, San Jose, CA (US); Vineet Haresh Mehta, Mountain View, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 316 days.

(21) Appl. No.: 12/456,382

(22) Filed: Jun. 15, 2009

(65) Prior Publication Data

US 2010/0318266 A1 Dec. 16, 2010

(51) Int. Cl.
G05D 3/10 (2006.01)
A47C 1/024 (2006.01)
G06F 3/041 (2006.01)
G06F 3/048 (2006.01)

(52) U.S. Cl. ............. 701/49; 297/61; 345/173; 715/810
(58) Field of Classification Search .................... 701/49, 701/36; 297/61, 284.1, 248.4, 248.7, 311, 297/313, 325, 330, 337, 338, 344.1; 345/173, 345/184; 715/700, 716, 717, 718, 719, 810, 715/816, 826, 833
See application file for complete search history.

(56) References Cited

U.S. PATENT DOCUMENTS

| | | | |
|---|---|---|---|
| 4,833,614 A * | 5/1989 | Saitoh et al. ................. 701/49 |
| 5,555,172 A * | 9/1996 | Potter ....................... 455/456.1 |
| 5,808,374 A * | 9/1998 | Miller et al. ................ 307/10.1 |
| 6,009,355 A * | 12/1999 | Obradovich et al. .............. 701/1 |
| 6,064,932 A * | 5/2000 | François .......................... 701/49 |
| 6,657,316 B1 * | 12/2003 | Smith et al. .................. 307/10.1 |
| 6,708,086 B2 * | 3/2004 | Richard ............................ 701/1 |
| 6,830,123 B2 * | 12/2004 | Ohki et al. ...................... 180/326 |
| 6,859,687 B2 * | 2/2005 | Obradovich et al. .............. 701/1 |
| 7,489,303 B1 | 2/2009 | Pryor |
| 7,802,198 B2 * | 9/2010 | Obradovich .................. 715/790 |
| 7,956,853 B2 * | 6/2011 | Takashima et al. ........... 345/184 |
| 2006/0242580 A1 * | 10/2006 | Obradovich .................. 715/700 |
| 2008/0141129 A1 * | 6/2008 | Oozawa et al. ................ 715/702 |
| 2008/0147271 A1 * | 6/2008 | Breed ............................ 701/36 |
| 2008/0177440 A1 * | 7/2008 | Shibata et al. .................. 701/36 |
| 2008/0288137 A1 * | 11/2008 | Hatta .............................. 701/36 |
| 2009/0118902 A1 * | 5/2009 | Boger et al. .................... 701/36 |
| 2009/0210110 A1 * | 8/2009 | Dybalski et al. ................ 701/29 |
| 2009/0216383 A1 * | 8/2009 | Klinger et al. ................ 700/278 |
| 2009/0231145 A1 * | 9/2009 | Wada et al. .................... 340/575 |
| 2009/0231271 A1 * | 9/2009 | Heubel et al. ................. 345/156 |
| 2010/0066137 A1 * | 3/2010 | Sakai et al. ................. 297/217.3 |
| 2010/0107121 A1 * | 4/2010 | Kawachi ....................... 715/823 |

(Continued)

FOREIGN PATENT DOCUMENTS

JP 10-512214 * 11/1998

*Primary Examiner* — Ruth Ilan
*Assistant Examiner* — Karen A Beck
(74) *Attorney, Agent, or Firm* — Patent Law Office of David G. Beck

(57) ABSTRACT

A method and apparatus for controlling a particular vehicle function, for example the adjustment of a vehicle seat, using a graphical user interface (GUI) is provided. The GUI is activating by toggling a control, switch intuitively linked to the particular vehicle function. The control switch is separate from, and not proximate to, the GUI. When the GUI is activated by toggling the control switch, a control screen specific to the particular vehicle function is displayed on the GUI.

16 Claims, 4 Drawing Sheets

U.S. PATENT DOCUMENTS

| | | | |
|---|---|---|---|
| 2010/0175014 A1* | 7/2010 | Obradovich | 715/771 |
| 2010/0188343 A1* | 7/2010 | Bach | 345/173 |
| 2010/0306706 A1* | 12/2010 | Gill et al. | 715/839 |
| 2011/0037725 A1* | 2/2011 | Pryor | 345/174 |

* cited by examiner

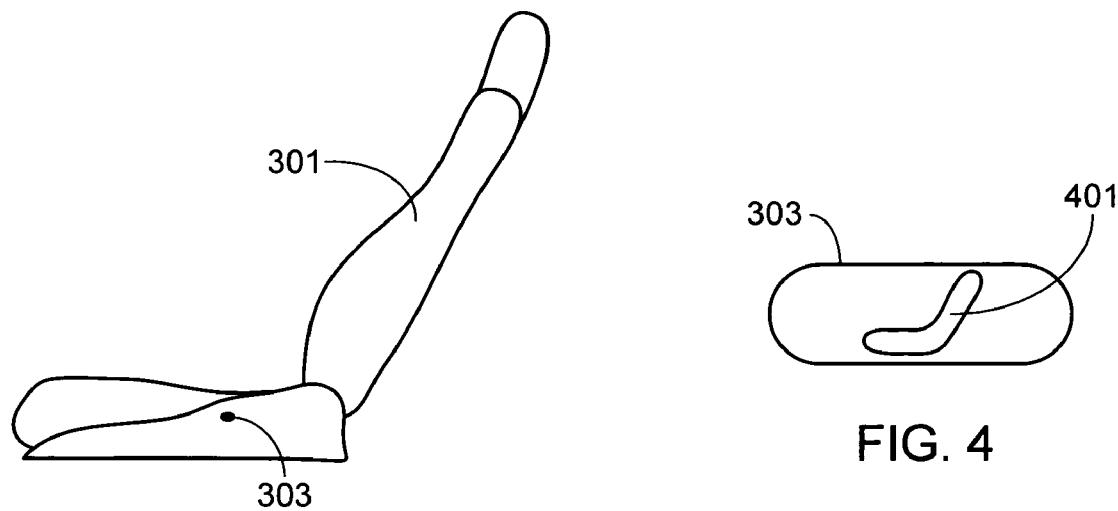
FIG. 3
FIG. 4
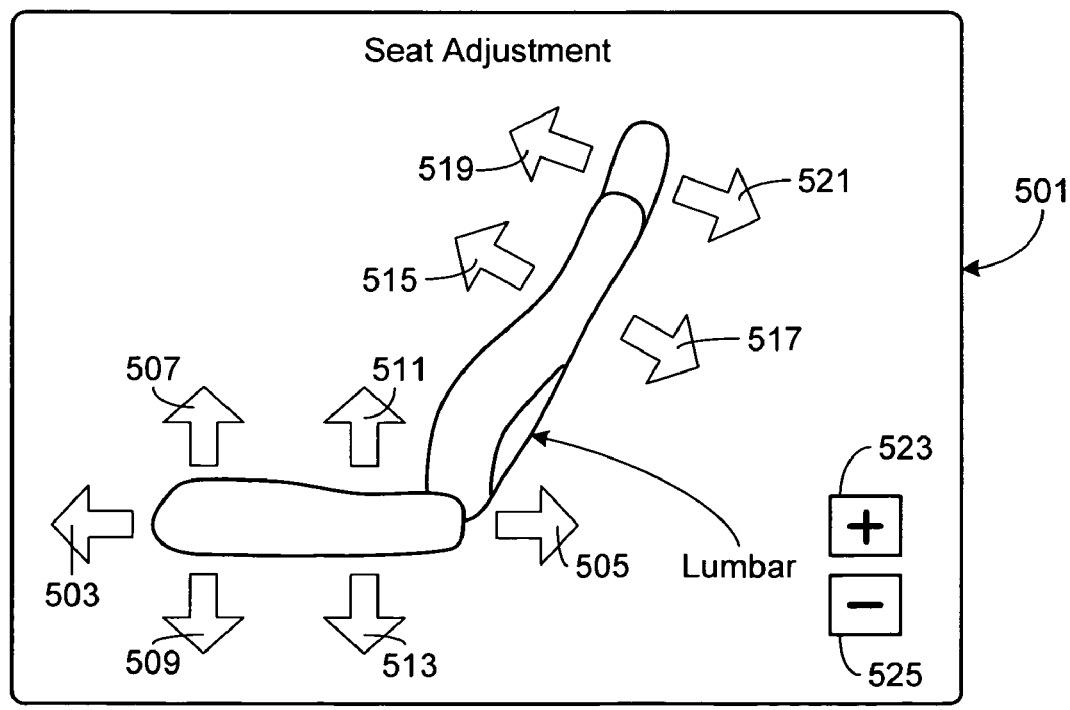
FIG. 5

INTERFACE FOR VEHICLE FUNCTION CONTROL VIA A TOUCH SCREEN

FIELD OF THE INVENTION

The present invention relates generally to means for adjusting a vehicle function and, more particularly, to a system for achieving an intuitive connection between the vehicle function and the means used to control its adjustment.

BACKGROUND OF THE INVENTION

Vehicle seats in general, and driver and front passenger seats in particular, are typically designed to be adjustable, thereby providing the user with the means of achieving a comfortable driving position. These adjustments are particularly important for the driver's seat in order to provide the driver with adequate visibility as well as ensuring that all necessary vehicle controls, such as the throttle and brake pedals, steering wheel, stalk-mounted controls, dash mounted controls, and gear shift, are within easy and comfortable reach. Early generation car seats had limited adjustability, typically only forward-backward motion along a longitudinal axis and incline of the backrest, both operated manually using levers. More recently, car seats have been developed that not only offer longitudinal position and backrest incline adjustments, but also provide one or more other adjustments including seat incline, seat height, headrest incline, headrest height, seat width, backrest width, and lumbar support. These adjustments are often motor actuated, requiring the user to simply select the aspect of the seat to be adjusted and then make the adjustment by pressing or otherwise moving a corresponding switch.

Vehicle manufacturers use a variety of means to insure that the vehicle's user is able to locate and make the desired seat adjustments with minimal distraction, even if the user is not familiar with that particular vehicle. For example, seat adjustment switches are often mounted on the side of the seat or adjacent to the seat on the door panel, thus making it easy for the user to reach down or over and make the desired adjustment while driving. Additionally, these seat adjustment switches are often shaped to make their use intuitive. For example, FIG. 1 shows an exemplary switching mechanism designed to be mounted on the lower portion of a car seat and to control the longitudinal position, backrest incline and headrest incline adjustments of a motorized vehicle seat. As shown, switches 101-103 are configured to mimic the relative shapes and locations of the car seat, backrest and headrest of the car seat. With very little experimentation, the user is able to determine that sliding switch 101 forward-backward moves the seat forward-backward, respectively; tilting switch 102 in directions 105/106 about axis 107 adjusts the incline of the backrest forward-backward, respectively; and tilting switch 103 in directions 109/110 about axis 111 adjusts the incline of the headrest forward-backward, respectively. FIG. 2 shows a similarly configured set of switches 201/203 according to the prior art, these switches allowing longitudinal adjustment of the seat position by moving switch 201 in a forward direction 205 or a backward direction 207; backrest tilt by moving switch 203 in a forward direction 209 or a backward direction 211; seat height adjustment by moving switch 201 in an upward direction 213 or a downward direction 215; and seat cushion tilt by moving switch 201 in an upward direction 217 or a downward direction 219.

Although the car seat control modules described above provide the user with a relatively intuitive set of seat adjustment controls, this form of control may not be optimal under a variety of circumstances. For example, in some sports cars the distance between the car seat and the door panel may be inadequate to provide sufficient room for the user to access and manipulate a full set of seat mounted or door panel mounted controls. Alternately, the shape and/or size of the seat may make it difficult to mount a seat control module within the side of the seat. Alternately, a vehicle manufacturer may find that seat mounted control modules, while intuitive, are too distracting for the driver to use during vehicle operation. Accordingly, what is needed in the art is a means of adjusting the seats of a vehicle that is intuitive, easy to use, and applicable to a wide range of vehicles and car seats. The present invention provides such a means.

SUMMARY OF THE INVENTION

The present invention provides a method and apparatus for controlling a particular vehicle function, for example the adjustment of a vehicle seat, using a graphical user interface (GUI). The GUI is activating by toggling a control switch intuitively linked to the particular vehicle function. The control switch is separate from, and not proximate to, the GUI. When the GUI is activated by toggling the control switch, a control screen specific to the particular vehicle function is displayed on the GUI.

In at least one embodiment of the invention, a seat adjustment control system is provided comprised of a GUI configured to control multiple vehicle functions, and a vehicle seat control switch separate from, and not proximate to, the GUI. Toggling the vehicle seat control switch activates the GUI, causing the GUI to display a vehicle seat adjustment screen. Toggling the control switch may cause the GUI to automatically bypass a plurality of menu and control screens prior to displaying the vehicle seat adjustment screen. The GUI may be a touch screen. The vehicle adjustment screen may include a plurality of touch-sensitive regions corresponding to and controlling a plurality of adjustable regions on the vehicle seat, such as seat position and backrest tilt. The vehicle adjustment screen may include a plurality of touch-sensitive regions, at least some of which may be touch-and-drag regions. The vehicle control switch may be mounted to the vehicle seat, the door adjacent to the vehicle seat, or to the central console. Toggling the control switch may cause a sound to be emitted in proximity to the GUI.

In at least one embodiment of the invention, a method of providing adjustment control over a vehicle seat is provided, the method comprising the steps of providing a vehicle control switch mounted to the vehicle seat, activating a GUI when the vehicle seat control switch is toggled, bypassing at least one of multiple menu and control screens when the vehicle seat control switch is toggled, and displaying a vehicle seat adjustment screen on the GUI when the vehicle seat control switch is toggled. The method may further comprise the step of displaying a plurality of touch-sensitive regions corresponding to and controlling a plurality of adjustable vehicle seat regions, wherein some of the touch-sensitive regions may be touch-and-drag regions. The method may further comprise the step of emitting a sound in proximity to the GUI when the vehicle seat control switch is toggled.

A further understanding of the nature and advantages of the present invention may be realized by reference to the remaining portions of the specification and the drawings.

BRIEF DESCRIPTION OF THE DRAWINGS

FIG. 3 illustrates a vehicle seat with a vehicle seat control switch in accordance with the invention;

FIG. 4 illustrates a vehicle seat control switch that includes a suitable icon;

FIG. 5 illustrates a seat adjustment GUI screen;

DESCRIPTION OF THE SPECIFIC EMBODIMENTS

Figure 1:
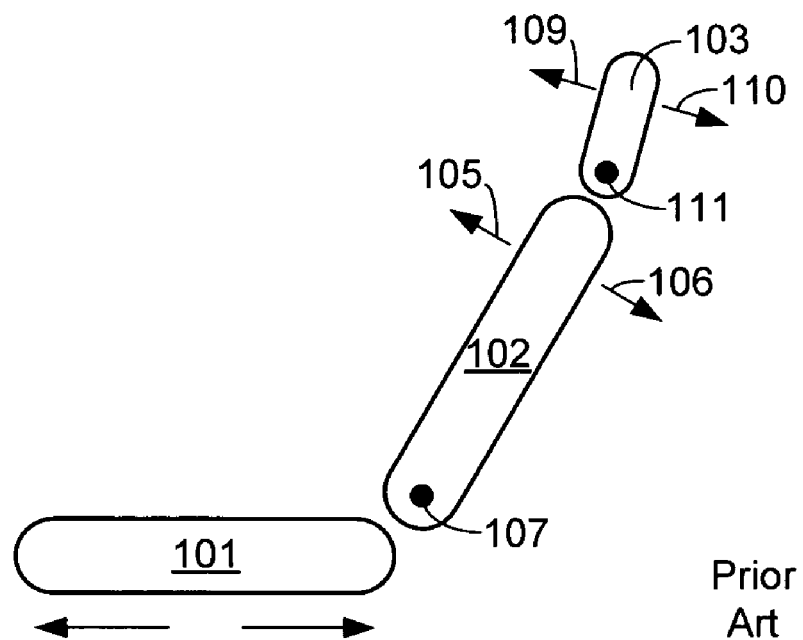
FIG. 1 illustrates a car seat control module according to the prior art.
Figure 2:
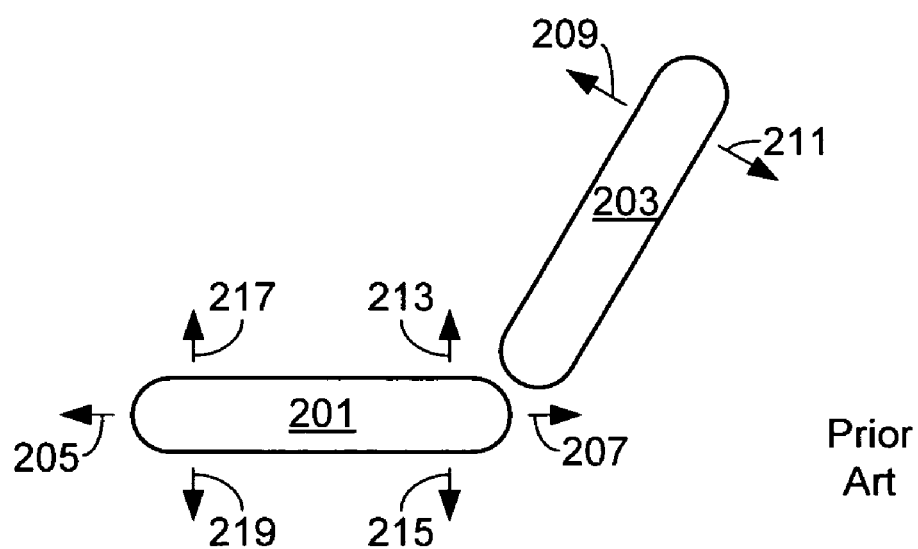
FIG. 2 illustrates an alternate car seat control module according to the prior art.

FIG. 3 illustrates a side view of a vehicle seat 301 that includes a control switch 303 in accordance with the invention. Preferably switch 303 is a push-button switch although other types of switches may be used. As used herein and in reference to switch 303, the term "toggle" refers to changing the state of switch 303, for example by depressing switch 303 if it is of the form of a push-button switch. Switch 303 activates the seat adjustment means as described more fully below. Preferably control switch 303 is located in a position on the side of seat 301 where the seat adjustment control panel is typically located in a conventional vehicle. Alternately, control switch 303 can be located in a conspicuous location such as on the door panel, arm rest or center console, and preferably labeled with a suitable identifier, e.g., "SEAT" or "SEAT ADJUSTMENT" or "DRIVER SEAT" or "PASSENGER SEAT", etc. The identifier may also be a suitable icon, such as that of a car seat 401 as shown in FIG. 4.

When control switch 303 is toggled, for example by depressing if switch 303 is in the form of a push-button switch, a seat adjustment screen 501 appears on the vehicle's graphical user interface (GUI) as illustrated in FIG. 5. As control switch 303 is separate from, and not proximate to, the GUI, preferably at the same time that the seat adjustment screen is presented on the GUI, a sound (e.g., a chime, beep, etc.) is emitted in close proximity to the GUI, thus drawing the user's attention to the GUI. Preferably the GUI is a touch-sensitive display although a non-touch sensitive screen used in conjunction with a plurality of switches (e.g., toggle switches, push button switches, slide switches, rotating switches, etc.) may also be used with the invention. Although the GUI may be a stand-alone interface, preferably it is used to perform a variety of functions associated with the operation of the vehicle in addition to adjusting the car seats, such as monitoring and/or controlling aspects of vehicle performance, monitoring and/or adjusting system default settings, controlling air conditioning and heating, controlling audio entertainment functions, controlling the cell phone interface and providing navigation system controls/interface.

It will be appreciated that in a typical configuration, seat adjustment screen 501 can also be activated by drilling down through a series of interface screens. For example, a user may first activate the system by touching the GUI screen, then selecting "SETTINGS", then selecting "OCCUPANT COMFORT", and then selecting "SEAT ADJUSTMENT". In this example, in takes four screen touches to reach the same seat adjustment screen 501 as obtained by simply toggling control switch 303 in accordance with the invention. More importantly, however, is the fact that most users would not consider using the GUI to make seat adjustments, as there is no intuitive connection between the GUI and the car seat. Accordingly, a typical user might never locate seat adjustment screen 501 without using control switch 303 since most casual users, and even most vehicle owners, never fully explore the capabilities of the GUI and only rely on the owner's manual when all else fails. As such, it will be appreciated that one of the primary benefits of the preferred embodiment of the invention is to make the means of adjusting the seat, i.e., the GUI, intuitive by locating control switch 303, the preferred means of activating seat adjustment screen 501, where a typical user would expect to locate the seat adjustment controls.

As previously noted, after control switch 303 is toggled (e.g., depressed), seat adjustment screen 501 appears on the GUI, bypassing any screens that would be required if the user were to drill down to screen 501 without using control switch 303. In one preferred embodiment, seat adjustment screen 501 includes a representation of the car seat with seat adjustment buttons, i.e., touch-sensitive regions on screen 501, which represent the various aspects of the seat that can be adjusted. It will be appreciated that seat adjustment screen 501 may include more or less degrees of adjustment freedom, and those illustrated in FIG. 5 are only meant to illustrate the operation of the invention, not limit its implementation. As shown, in this embodiment the user is able to move the seat forward (i.e., button 503) or backwards (i.e., button 505), tilt the seat upwards (i.e., button 507) or downwards (i.e., button 509), raise (i.e., button 511) or lower (i.e., button 513) the seat, tilt the backrest forwards (i.e., button 515) or backwards (i.e., button 517), tilt the headrest forwards (i.e., button 519) or backwards (i.e., button 521), and increase (i.e., button 523) or decrease (i.e., button 525) the lumbar support.

Figure 6:
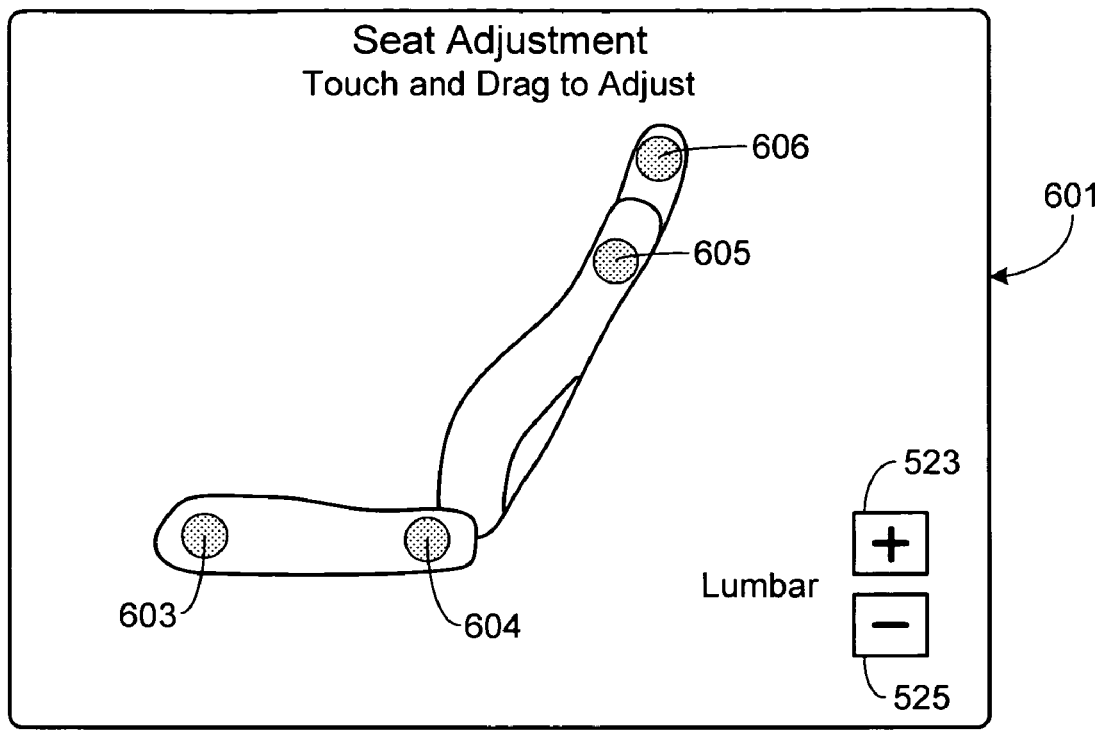
FIG. 6 illustrates an alternate seat adjustment GUI screen.

FIG. 6 illustrates an alternate seat adjustment screen 601. In this embodiment, the user presses/touches one of the highlighted 'touch' regions 603-606 and drags the indicated seat portion where desired. Thus, for example, if the user presses on touch region 605 and moves their finger in an approximately forward direction prior to removing their finger from the screen, the backrest would be tilted further forward. In this embodiment, preferably the seat motors continue to move the seat in the designated direction until the user removes their finger from the screen, or until the seat reaches its maximum motion in the designated direction. Thus, for example, if the user presses on touch region 603 and moves their finger in an approximately downward direction, the seat will begin tilting downwards and will continue moving in a downward motion until the user removes their finger from touch region 603 or the end of available movement is reached.

Figure 7:
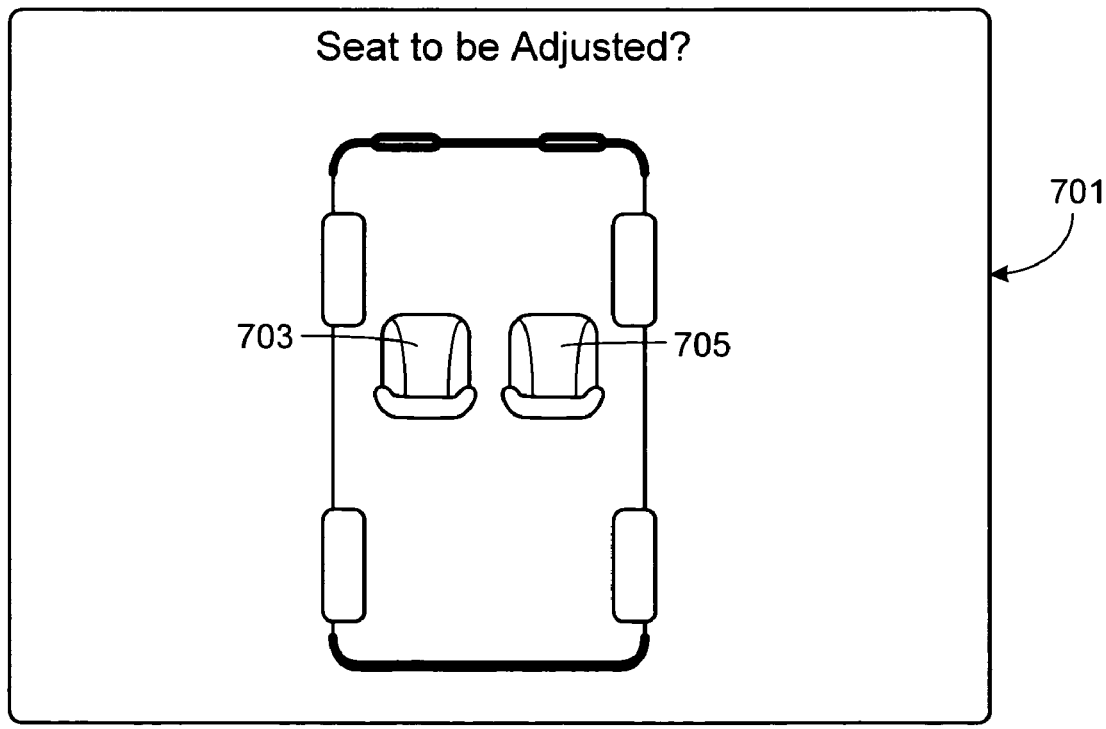
FIG. 7 illustrates a seat selection GUI screen.
Figure 8:
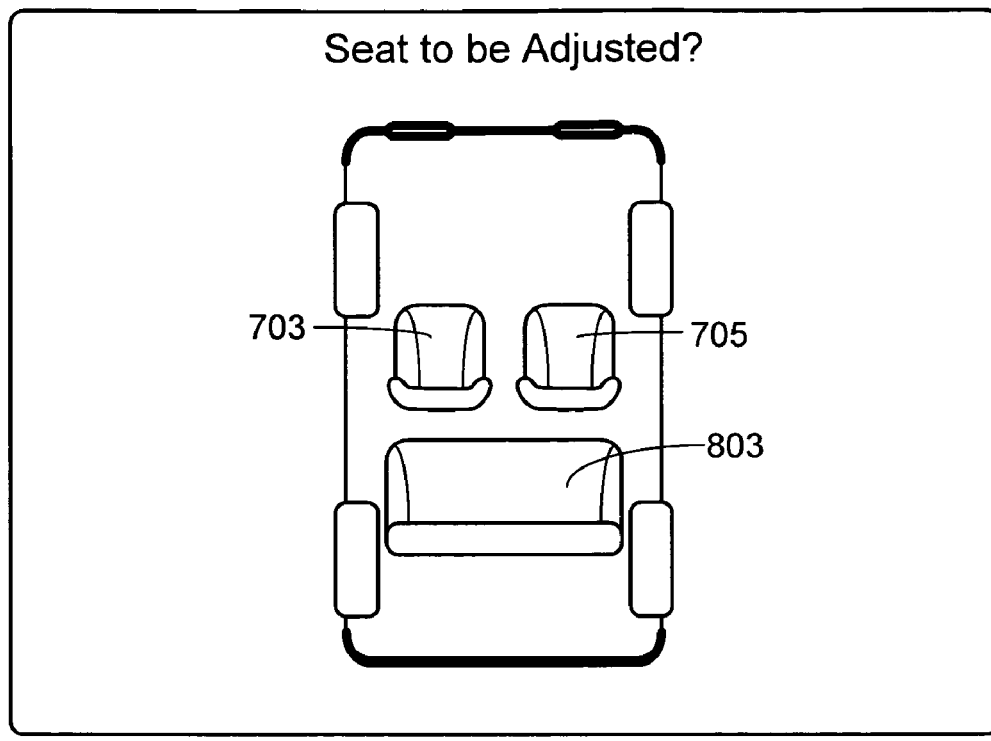
FIG. 8 illustrates an alternate seat selection GUI screen.

Vehicle seat adjustment screens 501 and 601 assume that control switch 303 is located on or close to the seat to be adjusted, for example on the side of the seat or on the adjacent door panel. If control switch 303 is located close to multiple seats, for example on the central console between the driver and front passenger seat, then the system must include means to indicate which seat is to be adjusted. For example, the central console could include two side-by-side buttons, each marked "SEAT ADJUSTMENT". Depending upon which of these buttons is depressed, screen 501 (or screen 601) would be used to adjust either the driver's seat or the passenger's seat. Alternately, a single switch 303 marked "SEAT ADJUSTMENT" could be located on the central console. In this instance, when switch 303 is toggled (e.g., pushed or depressed), a first screen 701 would be shown on the GUI, screen 701 including a representation of the vehicle and touch regions for each seat that can be adjusted, e.g., touch regions 703 and 705. Once the user selects a seat to be adjusted, specifically by touching the representation of the seat in question, then a seat adjustment screen such as those shown in FIGS. 5 and 6 would be presented on the GUI. It will be appreciated that while FIG. 7 only shows two possible seats from which to select, the same approach can be used with a larger number of seats. For example, screen 801 of FIG. 8 is similar to screen 701, but with the addition of a rear passenger bench seat and corresponding touch region 803.

It should be understood that different seat adjustment screens may be presented on the GUI depending upon which seat is selected for adjustment and the number of adjustments available for that seat. For example, the driver's seat typically offers the greatest number of possible seat adjustments since it is very important for the driver to achieve the proper driving position relative to the vehicle's controls, e.g., steering wheel, pedals, dash and stalk mounted controls, etc. The front passenger seat will typically have the same or fewer possible seat adjustments as the driver's seat. If the rear passenger seat or seats are adjustable, typically very few degrees of adjustment are provided, for example only backrest tilt. As such, the seat adjustment screen for these seats will be quite different from that provided for the driver's seat.

Figure 9:
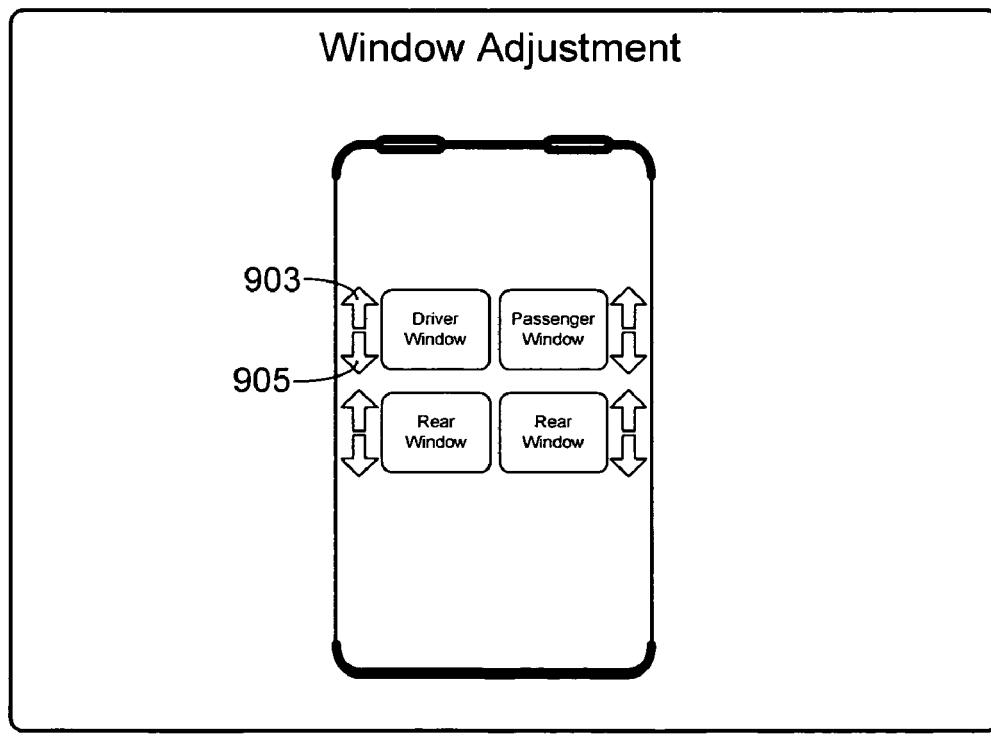
FIG. 9 illustrates a window adjustment GUI screen.

While the invention has been described relative to the adjustment of the seats in a vehicle, it should be understood that the invention may be applied to other facets of the car ranging from cabin lighting to operating doors, folding seats, the trunk, etc. For example, the center console could include a button labeled "WINDOWS". When that button is pushed, the system drills down to a window adjustment screen 901 as shown in FIG. 9. Associated with each window are one or more control regions. Thus in exemplary screen 901, the user can raise or lower the driver window by pressing/touching regions 903 or 905, respectively.

As will be understood by those familiar with the art, the present invention may be embodied in other specific forms without departing from the spirit or essential characteristics thereof. For example, the screen representations in the accompanying figures are only meant to illustrate operation of the invention, not limit the scope of the invention. Accordingly, the disclosures and descriptions herein are intended to be illustrative, but not limiting, of the scope of the invention which is set forth in the following claims.

What is claimed is:

1. In combination with a vehicle seat, a seat adjustment control system, comprising:
    a graphical user interface (GUI) configured to control multiple vehicle systems associated with vehicle operation, wherein said GUI uses multiple menu and control screens to control said multiple vehicle systems, wherein said GUI is comprised of a touch screen, and wherein control of said multiple vehicle systems is provided through direct interaction with a plurality of touch-sensitive regions located on said GUI; and
    a vehicle seat GUI activation switch separate from said GUI, wherein said vehicle seat GUI activation switch is not proximate to said GUI, wherein said vehicle seat GUI activation switch is intuitively linked to the vehicle seat, wherein said vehicle seat GUI activation switch is only linked to the vehicle seat, and wherein toggling said vehicle seat GUI activation switch activates said GUI and causes said GUI to display a vehicle seat adjustment screen, and wherein adjustment of said vehicle seat is provided through direct interaction with said plurality of touch-sensitive regions located on said vehicle seat adjustment screen.

2. The seat adjustment control system of claim 1, wherein toggling said vehicle seat GUI activation switch causes said GUI to automatically bypass a plurality of menu and control screens.

3. The seat adjustment control system of claim 1, wherein said vehicle seat adjustment screen controls a plurality of adjustable regions corresponding to the vehicle seat.

4. The seat adjustment control system of claim 1, wherein said plurality of touch-sensitive regions correspond to and control a plurality of adjustable regions of the vehicle seat.

5. The seat adjustment control system of claim 4, wherein said plurality of adjustable regions include seat position and backrest tilt.

6. The seat adjustment control system of claim 1, wherein at least a portion of said plurality of touch-sensitive regions are touch-and-drag regions.

7. The seat adjustment control system of claim 1, wherein said vehicle seat GUI activation switch is mounted to the vehicle seat.

8. The seat adjustment control system of claim 1, wherein said vehicle seat GUI activation switch is mounted to a door adjacent to the vehicle seat.

9. The seat adjustment control system of claim 1, wherein said vehicle seat GUI activation switch is mounted to a central vehicle console.

10. The seat adjustment control system of claim 1, wherein toggling said vehicle seat GUI activation switch causes said GUI to display a vehicle seat selection screen, wherein said vehicle seat adjustment screen is displayed after the vehicle seat is selected on said vehicle seat selection screen.

11. The seat adjustment control system of claim 1, wherein toggling said vehicle seat GUI activation switch causes a sound to be emitted in proximity to said GUI.

12. The seat adjustment control system of claim 1, wherein said vehicle seat GUI activation switch is a push-button switch, and wherein depressing said push-button switch toggles said vehicle seat GUI activation switch.

13. A method of providing adjustment control over a vehicle seat, the method comprising the steps of:
    providing a vehicle seat GUI activation switch mounted to the vehicle seat, wherein said vehicle seat GUI activation switch is only linked to the vehicle seat;
    activating a graphical user interface (GUI) when said vehicle seat GUI activation switch is toggled, wherein said GUI is comprised of a touch screen, and wherein said GUI uses multiple menu and control screens to control multiple vehicle systems;
    bypassing at least one of said multiple menu and control screens when said vehicle seat GUI activation switch is toggled;
    displaying a vehicle seat adjustment screen on said GUI when said vehicle seat GUI activation switch is toggled; and
    providing adjustment control over said vehicle seat utilizing a plurality of touch-sensitive regions on said vehicle seat adjustment screen of said GUI.

14. The method of claim 13, wherein said plurality of touch-sensitive regions correspond to and control a plurality of adjustable regions of the vehicle seat.

15. The method of claim 13, wherein said plurality of touch-sensitive regions correspond to and control a plurality of adjustable regions of the vehicle seat, wherein at least a portion of said plurality of touch-sensitive regions are touch-and-drag regions.

16. The method of claim 13, further comprising the step of emitting a sound proximate to said GUI when said vehicle seat GUI activation switch is toggled and said vehicle seat adjustment screen is displayed on said GUI.

* * * * *